(12) United States Patent
Butrymowicz et al.

(10) Patent No.: US 6,216,998 B1
(45) Date of Patent: Apr. 17, 2001

(54) FISHING ROD HOLDING ASSEMBLY AND METHOD OF USE

(76) Inventors: Richard Butrymowicz, 23 Rockwood La.; Walter Zimnoch, 161 Old Newton Rd., both of Monroe, CT (US) 06468

( * ) Notice: Subject to any disclaimer, the term of this patent is extended or adjusted under 35 U.S.C. 154(b) by 0 days.

(21) Appl. No.: 09/312,597

(22) Filed: May 17, 1999

(51) Int. Cl.[7] ............................ F16M 13/00; A01K 97/10
(52) U.S. Cl. ............................................ 248/530; 43/21.2
(58) Field of Search ................................... 248/530, 511, 248/520, 532, 545; 224/200, 400; 43/21.2, 26

(56) References Cited

U.S. PATENT DOCUMENTS

| | | | |
|---|---|---|---|
| 1,577,612 | * 3/1926 | Dees | 248/532 |
| 1,903,798 | * 4/1933 | Turner | 224/613 |
| 2,839,865 | * 6/1958 | Lubanski | 43/26 |
| 3,898,756 | 8/1975 | Tolle | 43/21.2 |
| 3,903,633 | 9/1975 | Hutcherson | 43/17 |
| 3,924,345 | 12/1975 | Sapp | 43/21.2 |
| 4,131,122 | * 12/1978 | Brooks | 135/76 |
| 4,658,534 | 4/1987 | McLean | 43/21.2 |
| 4,748,762 | * 6/1988 | Campbell | 43/21.2 |
| 5,183,154 | * 2/1993 | Slemp | 206/315.9 |
| 5,404,670 | * 4/1995 | Noll | 43/54.1 |
| 5,639,057 | 6/1997 | Yeomans | 248/530 |

OTHER PUBLICATIONS

Cover and p. 5 of brochure by Magic Products, Inc., Amherst Junction Wi, 1999, showing the "Rod Minder Rod Holder".

\* cited by examiner

*Primary Examiner*—Anita M. King
(74) *Attorney, Agent, or Firm*—John H. Crozier

(57) ABSTRACT

In a preferred embodiment, a fishing rod holding assembly, including: a first cylinder having an open top end and a generally closed bottom end, the first cylinder having a diameter selected such that the first cylinder can receive therein an end of a fishing rod such that the first cylinder can support the fishing rod at a selected angle with respect to a substrate; a first spike removably attachable to the generally closed bottom end of the first cylinder, the first spike extending from the generally closed bottom end and being adapted to be inserted in the substrate; a closure for substantially closing the open end of the first cylinder; and the first cylinder and the closure having conjointly a length sufficient to accommodate in a chamber delimited by the first cylinder and the closure the first spike when the first spike is removed from the closed bottom end of the first cylinder, without any portion of the first spike extending from the chamber.

6 Claims, 6 Drawing Sheets

FISHING ROD HOLDING ASSEMBLY AND METHOD OF USE

BACKGROUND OF THE INVENTION

1. Field of the Invention

The present invention relates to fishing rod holders generally and, more particularly, but not by way of limitation, to a novel fishing rod holder assembly and method of use that are safe and convenient.

2. Background Art

Fishing rod holders of the type under consideration herein typically have an open top cylinder with a spike coaxially aligned with the cylinder and removably or fixedly attached to the closed end of the cylinder. One uses the holder by inserting the sharp end of the spike into a substrate, such as the bank of a river, and then inserting the handle end of a fishing rod, or pole, into the cylinder for support of the fishing rod at an angle with respect to the substrate.

One disadvantage of the type of holder with a fixed spike is that sharp end of the spike is exposed when the holder is not in use and presents a safety hazard. The type of holder with a removable spike suffers from the same disadvantage but, in addition, has the further disadvantage that the spike may become separated from the cylinder and lost when the holder is not in use.

One approach to partially solving this problem is presented in U.S. Pat. No. 4,658,534, issued Apr. 21, 1987, to McLean, and titled FISHING POLE HOLDER DEVICE. The holder therein described is of the type having a removable spike. In this case, the spike is nail-like, with a head formed opposite the sharp end so that the spike can be driven into a substrate, such as ice, with a hard object, such as a hammer. A threaded collar is loosely disposed on the spike and is used to engage the head end to threadingly attach the spike to the closed end of the cylinder. When the holder is not in use, the spike is unscrewed, the head end of the spike is inserted into the open end of the cylinder and threadingly attached to the bottom end of the cylinder. This has the advantage of shortening the overall length of the device, but still has the disadvantage of having the sharp end of the spike protruding from the open end of the cylinder. Some length of the sharp end of the spike must protrude so that the spike can be manually grasped to insert or unscrew the spike.

Accordingly, it is a principal object of the present invention to provide a fishing rod holding assembly in which no sharp ends are exposed when the fishing pole holding assembly is not in use.

It is a further object of the invention to provide such a fishing rod holding assembly that is easy to use.

It is an additional object of the invention to provide such a fishing rod holding assembly that is economical to manufacture.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a fishing rod holding assembly, comprising: a first cylinder having an open top end and a generally closed bottom end, said first cylinder having a diameter selected such that said first cylinder can receive therein an end of a fishing rod such that said first cylinder can support said fishing rod at a selected angle with respect to a substrate; a first spike removably attachable to said generally closed bottom end of said first cylinder, said first spike extending from said generally closed bottom end and being adapted to be inserted in said substrate; a closure for substantially closing said open end of said first cylinder; and said first cylinder and said closure having conjointly a length sufficient to accommodate in a chamber delimited by said first cylinder and said closure said first spike when said first spike is removed from said closed bottom end of said first cylinder, without any portion of said first spike extending from said chamber.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
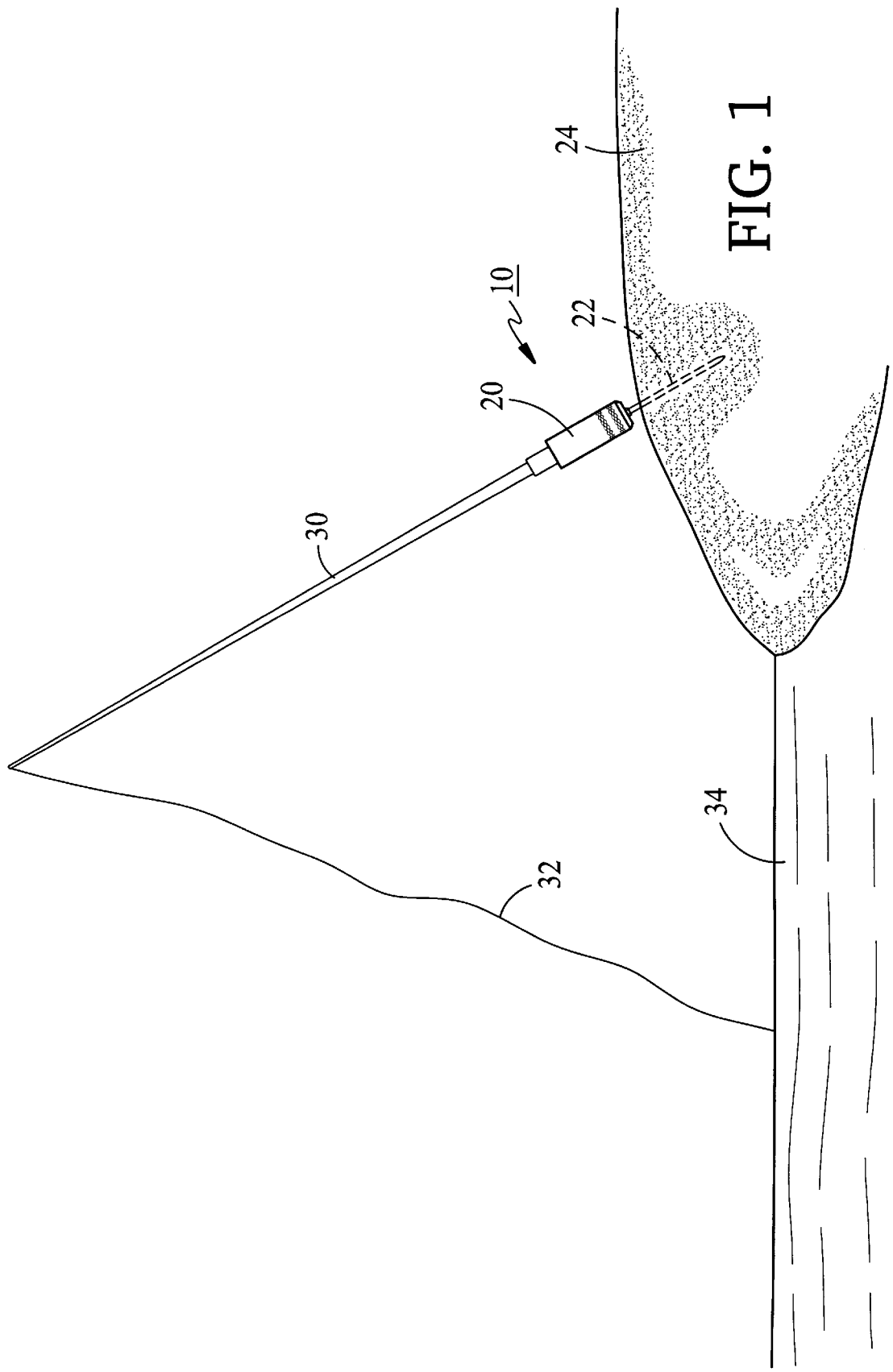
FIG. 1 is a side elevational view of the fishing rod holding assembly of the present invention in use.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a fishing rod holding assembly of the present invention in use, the fishing rod holding assembly being generally indicated by the reference numeral 10. Fishing rod holding assembly 10 is of the cylinder and spike type and includes a cylindrical member 20 to which is attached a spike member 22. As shown, spike member 22 has been inserted into a substrate, in this case a riverbank. The handle end of a fishing rod 30 has been inserted into cylindrical member 20 in the conventional manner and a fishing line 32 extends from the distal end of the fishing rod in to a river 34.

Figure 2:
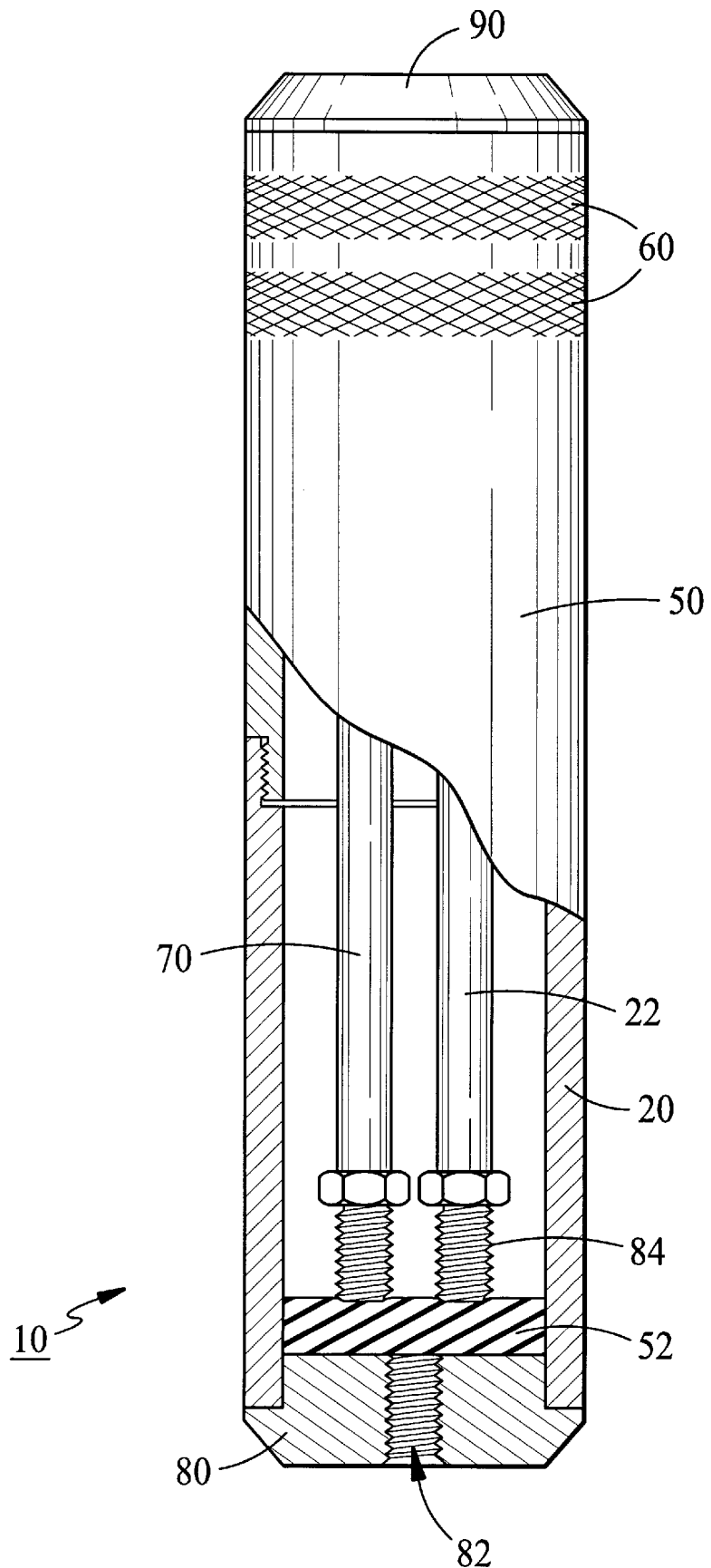
FIG. 2 is a side elevational view, partially in cross-section, of the fishing rod holding assembly when not in use.

FIG. 2 illustrates fishing rod holding assembly 10 when not in use, with spike 22 having been removed from the closed end of cylinder 20 and inserted into the cylinder. Rather than having spike 22 protruding from the open end of cylinder 20, the cylinder is closed with a threaded cap 50, with the spike being grippingly held between a resilient pad 52 disposed at the closed end of the cylinder and a similar pad disposed at the closed end of the threaded cap to keep spike 22 from rattling against the inner surfaces of the cylinder and the cap. Knurled external surfaces 60 are provided at the end of threaded cap 50 for the convenient manual grasping thereof.

The lower end of cylinder 20 is closed with an end cap 80 having a threaded central bore 82 for the removable insertion therein of the threaded end 84 of spike 22. End cap 80 may be fixedly attached to cylinder 20 by any suitable conventional means. As seen on FIG. 2, resilient pad 52 is disposed adjacent the inner surface of end cap 80 and may be adhesively attached thereto.

In the embodiment shown on FIG. 2, threaded cap 50 is, in fact, a second cylinder for use as a fishing pole holder and a second spike 70 is provided to complete the second fishing pole holder.

Figure 3:
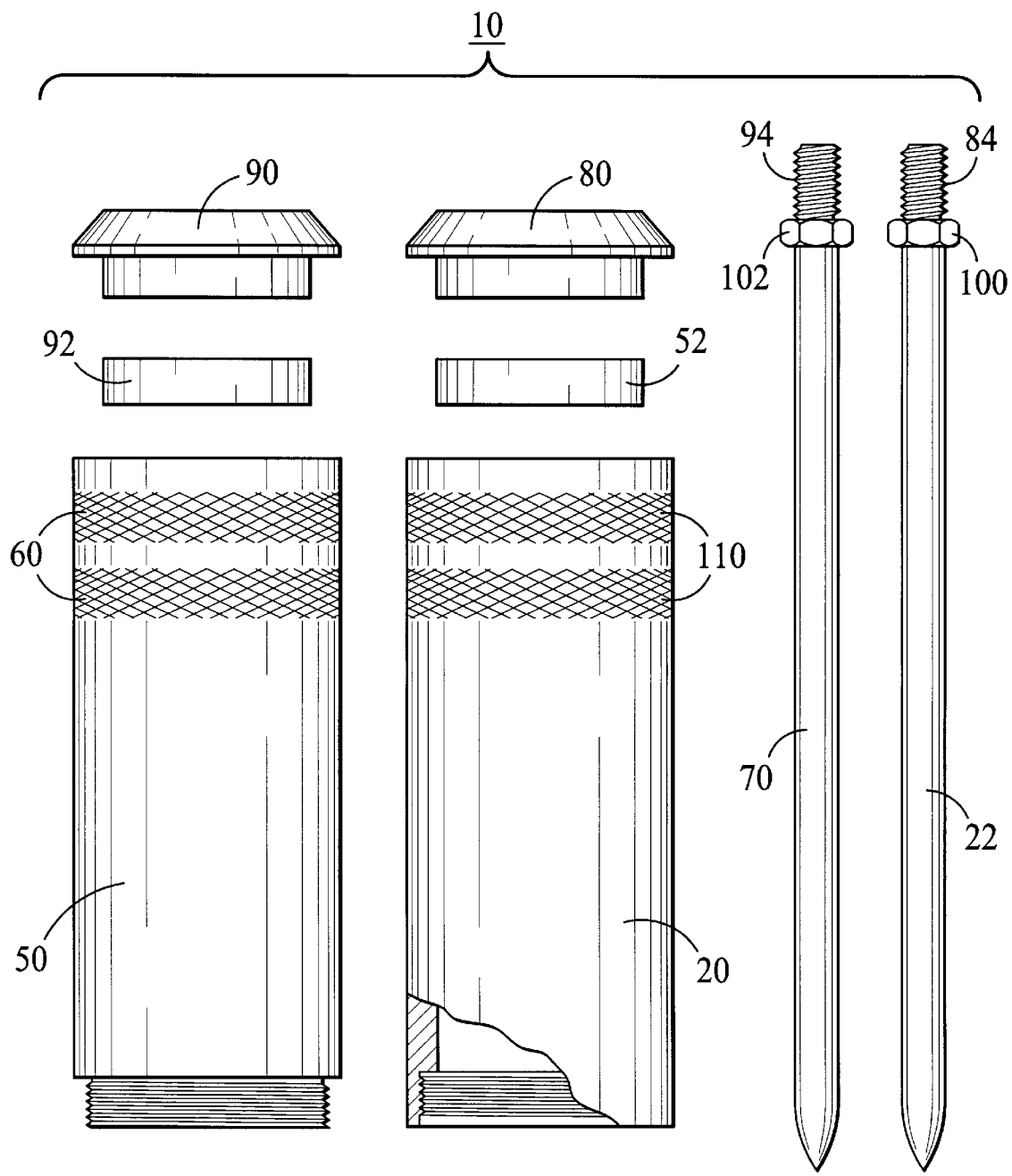
FIG. 3 is an exploded, side elevational view, partially cutaway and partially in cross-section, of the fishing rod holding assembly.

Referring principally to FIG. 3, all elements of the embodiment shown on FIG. 2 are illustrated. These include cylinders 20 and 50, spikes 22 and 70, resilient pad 52, knurled surfaces 60, end cap 80, and threaded end 84, all as described above with reference to FIG. 2. Additionally, shown on FIG. 3 are end cap 90 and resilient pad 92 for cylinder 50 and threaded end 94 of spike 70. Threaded stop nuts 100 and 102 are provided, respectively, on threaded ends 84 and 94 to limit the distance spike 20 can be inserted into bore 82 (FIG. 2) and to limit the distance spike 70 can be inserted into a similar bore (not shown) in end cap 90. Knurled surfaces 110 are provided on cylinder 20 for the convenient manual grasping of the cylinder.

Figure 4:
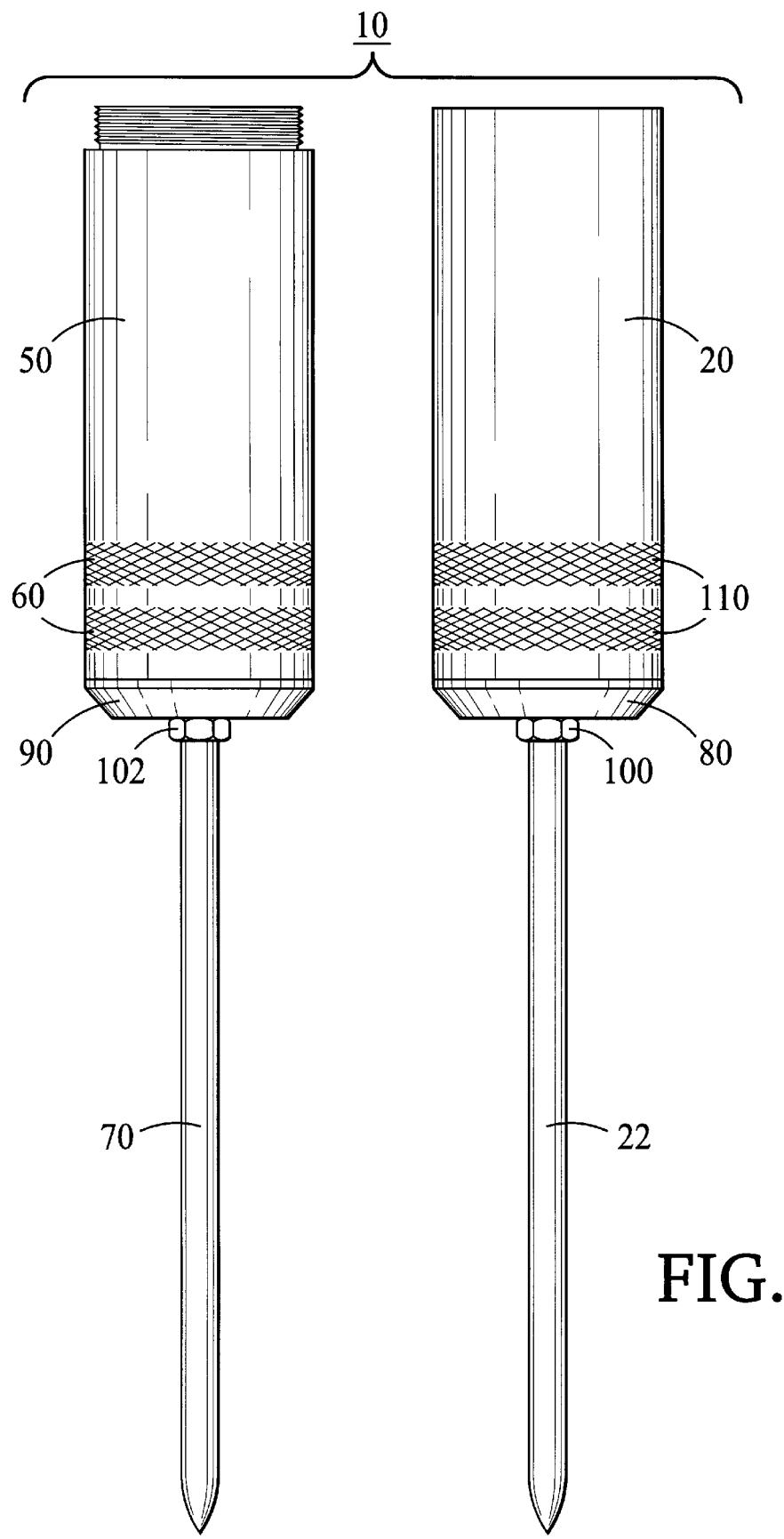
FIG. 4 is a side elevational view of the fishing rod holding assembly assembled for use.

FIG. 4 illustrates fishing rod holding assembly 10 assembled for use, as illustrated on FIG. 1, with spike 22 threadingly inserted into end cap 80 of cylinder 20 and, when end cap 50 is provided as a second fishing rod holder, with spike 70 threadingly inserted into end cap 90 of cylinder 50. It will be understood that FIG. 1 illustrates only one-half of the embodiment that includes two fishing rod holders (FIG. 2).

Figure 5:
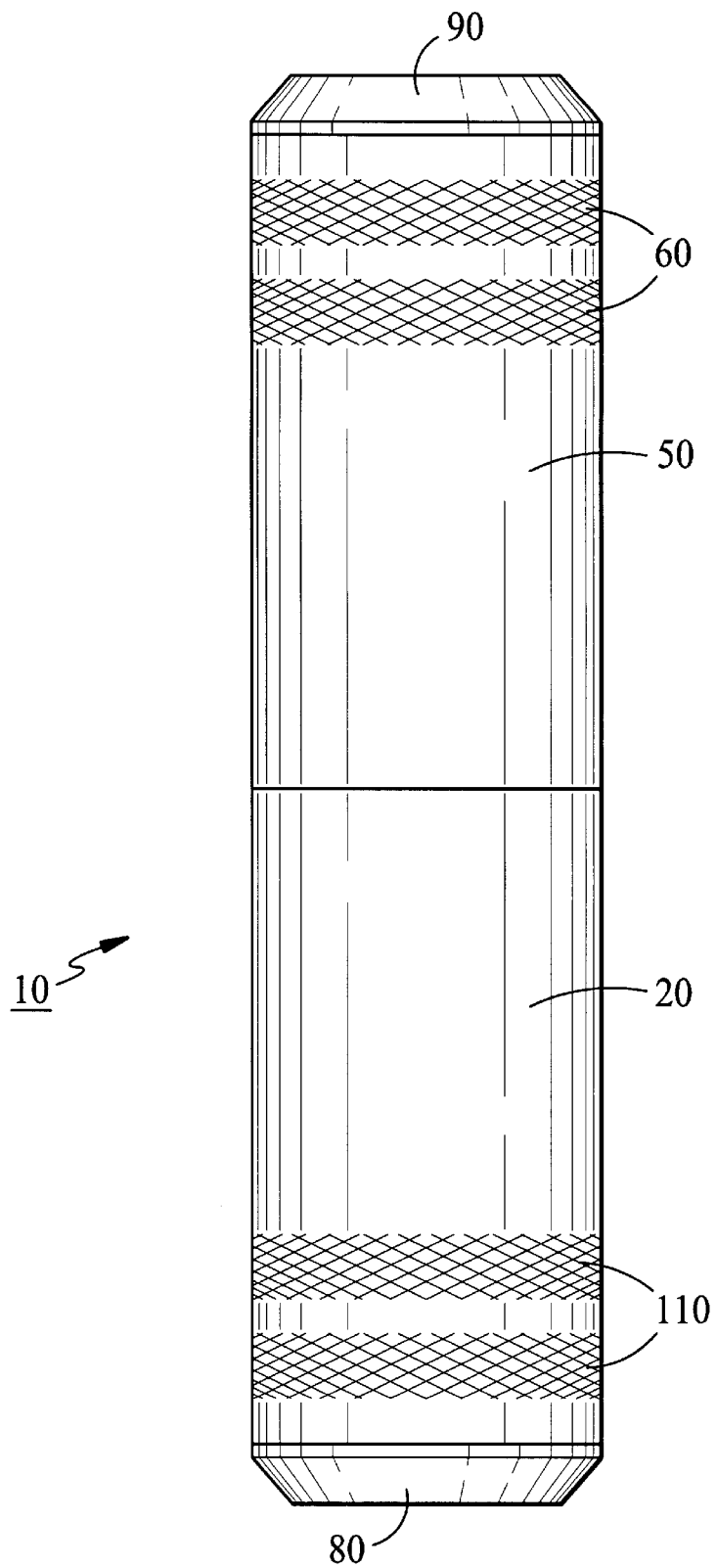
FIG. 5 is a side elevation view of the fishing rod holding assembly when not in use.

FIG. 5 illustrates fishing rod holding assembly 10 when not in use, with spikes 22 and 70 (FIG. 3) removed, respectively, from end caps 80 and 90 and inserted into the closed chamber delimited conjointly by cylinders 20 and 50 and end caps 80 and 90. It can be seen from inspection of FIG. 5 that the resulting closed package is very clean, with no sharp ends protruding therefrom to present a safety hazard. Spikes 22 and 70 are also securely held in the closed chamber to prevent their being lost when fishing rod holding assembly is not in use.

Figure 6:
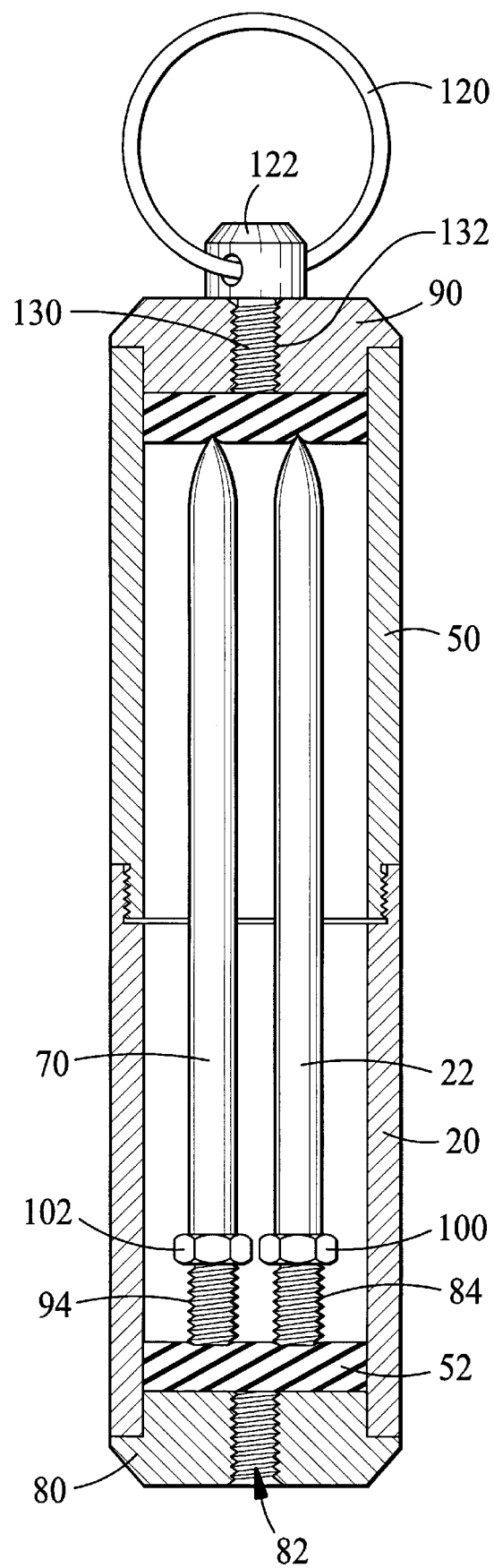
FIG. 6 is a side elevational view, partially in cross-section, of the fishing rod holding assembly with carrying means attached thereto.

FIG. 6 illustrates fishing rod holding assembly 10, having the elements described above, and having a carrying loop 120 loosely attached to a fitting 122. Fitting 122 has a threaded portion 130 which is threadingly inserted into a bore 132 defined through end cap 90. Loop 120 is configured such that the trousers belt (not shown) of a user can be inserted therethrough to suspend fishing rod holding assembly therefrom. Bore 132 is similar to bore 82 in end cap 80 and it will be understood that, when fishing rod holding assembly 10 is unscrewed from fitting 122, the threaded portion 94 of spike 70 may be threadingly inserted into bore 132.

The elements of fishing rod holding assembly 10 can be economically constructed from any suitable materials by conventional manufacturing techniques.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A fishing rod holding assembly, comprising:
   (a) a first cylinder having an open top end and a generally closed bottom end, said first cylinder having a diameter selected such that said first cylinder can receive therein an end of a first fishing rod such that said first cylinder can support said first fishing rod at a first selected angle with respect to a first substrate;
   (b) a first spike removably attachable to said generally closed bottom end of said first cylinder, said first spike extending from said generally closed bottom end and being adapted to be inserted in said first substrate;
   (c) a closure for substantially closing said open end of said first cylinder;
   (d) said first cylinder and said closure having conjointly a length sufficient to accommodate in a chamber delimited by said first cylinder and said closure said first spike when said first spike is removed from said closed bottom end of said first cylinder, without any portion of said first spike extending from said chamber;
   (e) said closure is a second cylinder having an open top end and a generally closed bottom end, said second cylinder having a diameter selected such that said second cylinder can receive therein an end of a second fishing rod such that said second cylinder can support said second fishing rod at a second selected angle with respect to a second substrate;
   (f) a second spike removably attachable to said generally closed bottom end of said second cylinder, said second spike extending from said generally closed bottom end of said second cylinder and being adapted to be inserted in said second substrate; and
   (g) said first cylinder and said second cylinder having conjointly said length sufficient to accommodate in said chamber delimited by said first cylinder and said second cylinder said second spike when said second spike is removed from said closed bottom end of said second cylinder, without any portion of said second spike extending from said chamber.

2. A fishing rod holding assembly, as defined in claim 1, further comprising: resilient pads disposed at opposite ends of said chamber.

3. A fishing rod holding assembly, as defined in claim 1, further comprising: carrying means disposed at an end of said closure distant from said open end of said first cylinder.

4. A fishing rod holding assembly, as defined in claim 3, wherein: said carrying means includes a loop.

5. A method of using a fishing holding assembly, comprising the steps of:
   (a) providing a first cylinder having an open top end and a generally closed bottom end, said first cylinder having a diameter selected such that said first cylinder can receive therein an end of a first fishing rod such that said first cylinder can support said first fishing rod at a first selected angle with respect to a first substrate;

(b) providing a first spike removably attachable to said generally closed bottom end of said first cylinder, said first spike extending from said generally closed bottom end and being adapted to be inserted in said first substrate;

(c) providing a closure for substantially closing said open end of said first cylinder;

(d) providing said first cylinder and said closure having conjointly a length sufficient to accommodate in a chamber delimited by said first cylinder and said closure said first spike when said first spike is removed from said closed bottom end of said first cylinder, without any portion of said first spike extending from said chamber;

(e) inserting said first spike in said first substrate;

(f) attaching said first spike to said closed bottom end of said first cylinder; and (g) inserting said end of said first fishing rod in said first cylinders;

(h) providing said closure as a second cylinder having an open top end and a generally closed bottom end, said second cylinder having a diameter selected such that said second cylinder can receive therein an end of a second fishing rod such that said second cylinder can support said second fishing rod at a second selected angle with respect to a second substrate;

(i) providing a second spike removably attachable to said generally closed bottom end of said second cylinder, said second spike extending from said generally closed bottom end of said second cylinder and being adapted to be inserted in said second substrate; and (j) providing said first cylinder and said second cylinder having conjointly said length sufficient to accommodate in said chamber delimited by said first cylinder and said second cylinder said second spike when said second spike is removed from said closed bottom end of said second cylinder, without any portion of said second spike extending from said chamber.

6. A method of using a fishing rod holding assembly, as defined in claim 5, further comprising the steps of:

(k) removing said end of said first fishing rod from said first cylinder;

(l) removing said first spike from said first substrate;

(m) removing said first spike from said closed bottom end of said first cylinder;

(n) placing said first spike in said first cylinder; and (o) placing said closure on said open end of said first cylinder.

* * * * *